US012242672B1

(12) United States Patent
Nizamudeen Basha et al.

(10) Patent No.: US 12,242,672 B1
(45) Date of Patent: Mar. 4, 2025

(54) TRIGGERING ACTIONS BASED ON DETECTED MOTIONS ON AN ARTIFICIAL REALITY DEVICE

(71) Applicant: Meta Platforms Technologies, LLC, Menlo Park, CA (US)

(72) Inventors: Shaik Shabnam Nizamudeen Basha, Mountain View, CA (US); Peter Ju, San Mateo, CA (US); Eric Leung, San Francisco, CA (US); Pierluigi Taddei, Zürich (CH); Jianhan Xu, Vancouver (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 165 days.

(21) Appl. No.: 18/068,048

(22) Filed: Dec. 19, 2022

Related U.S. Application Data

(60) Provisional application No. 63/380,410, filed on Oct. 21, 2022.

(51) Int. Cl.
*G06F 3/01* (2006.01)
*G06T 11/00* (2006.01)

(52) U.S. Cl.
CPC .............. *G06F 3/017* (2013.01); *G06F 3/012* (2013.01); *G06T 11/00* (2013.01)

(58) Field of Classification Search
CPC ...... G06F 3/017; G06F 3/012; G06F 3/04883; G06F 3/04845; G06F 3/04842;
(Continued)

(56) References Cited

U.S. PATENT DOCUMENTS

| 5,649,061 A | 7/1997 | Smyth |
| 6,025,608 A | 2/2000 | Harris et al. |

(Continued)

FOREIGN PATENT DOCUMENTS

| JP | 5083992 B1 | 11/2012 |
| WO | 2014028251 A1 | 2/2014 |

(Continued)

OTHER PUBLICATIONS

Villanueva A., et al., "A Novel Gaze Estimation System with One Calibration Point," IEEE Transactions on Systems, Man, and Cybernetics, Part B (Cybernetics), Aug. 2008, vol. 38, No. 04, pp. 1123-1138.

(Continued)

*Primary Examiner* — Xilin Guo
(74) *Attorney, Agent, or Firm* — Potomac Law Group, PLLC; Dannon G. Allbee

(57) ABSTRACT

Aspects of the present disclosure can trigger an action based on a motion detected by an artificial reality (XR) device, such as a head-mounted display (HMD). The XR device can display an XR experience to a user. While displaying the XR experience, the XR device can detect a physical interaction with the XR device using one of more sensors (e.g., sensors of an inertial measurement unit (IMU)). The physical interaction can generate a movement profile captured by the one or more sensors. The XR device can identify the physical interaction as a particular motion (e.g., one or more taps on the XR device) by applying a machine learning model to the movement profile. In response to identifying the particular motion, the XR device can trigger an action on the XR device (e.g., activating pass-through on the XR device).

20 Claims, 11 Drawing Sheets

(58) Field of Classification Search
CPC ....... G06T 11/00; G06T 19/006; G06T 19/20; G06V 20/20; G06V 40/28; G06V 40/10
See application file for complete search history.

(56) References Cited

U.S. PATENT DOCUMENTS

| | | | |
|---|---|---|---|
| 6,028,608 | A | 2/2000 | Jenkins |
| 6,070,098 | A | 5/2000 | Moore-Ede et al. |
| 9,406,211 | B2 | 8/2016 | Sahiholnasab et al. |
| 9,763,614 | B2 | 9/2017 | Geller et al. |
| 9,767,609 | B2 | 9/2017 | Eade et al. |
| 9,983,665 | B2 | 5/2018 | Hall |
| 10,453,431 | B2 | 10/2019 | El-Ghoroury |
| 10,567,641 | B1 | 2/2020 | Rueckner |
| 11,158,074 | B1 | 10/2021 | Kantor et al. |
| 11,238,340 | B1 | 2/2022 | Anderson et al. |
| 11,327,630 | B1 | 5/2022 | Khan et al. |
| 11,610,376 | B1 | 3/2023 | Smith et al. |
| 11,875,604 | B1 | 1/2024 | Abad et al. |
| 11,941,830 | B2 | 3/2024 | Kantor et al. |
| 11,978,169 | B2 | 5/2024 | Smith et al. |
| 2006/0098865 | A1 | 5/2006 | Yang et al. |
| 2007/0112277 | A1 | 5/2007 | Fischer et al. |
| 2012/0056982 | A1 | 3/2012 | Katz et al. |
| 2012/0143358 | A1 | 6/2012 | Adams et al. |
| 2012/0249741 | A1 | 10/2012 | Maciocci et al. |
| 2013/0084805 | A1 | 4/2013 | Pasquero et al. |
| 2014/0171775 | A1 | 6/2014 | Kilsgaard et al. |
| 2014/0240492 | A1 | 8/2014 | Lee |
| 2014/0327626 | A1* | 11/2014 | Harrison ............. G06F 3/04883 345/173 |
| 2015/0172622 | A1 | 6/2015 | Yoon et al. |
| 2015/0220768 | A1 | 8/2015 | Ronnecke et al. |
| 2015/0338915 | A1 | 11/2015 | Publicover et al. |
| 2016/0057340 | A1 | 2/2016 | You et al. |
| 2016/0116336 | A1 | 4/2016 | Zhao et al. |
| 2016/0119523 | A1 | 4/2016 | Egger et al. |
| 2016/0198949 | A1 | 7/2016 | Spitzer |
| 2016/0335790 | A1 | 11/2016 | Fleishman et al. |
| 2017/0113057 | A1 | 4/2017 | Goodall et al. |
| 2017/0123492 | A1 | 5/2017 | Marggraff et al. |
| 2017/0148215 | A1 | 5/2017 | Aksoy et al. |
| 2017/0156192 | A1 | 6/2017 | Chern et al. |
| 2017/0200266 | A1 | 7/2017 | Podilchuk et al. |
| 2017/0277257 | A1 | 9/2017 | Ota et al. |
| 2017/0285169 | A1 | 10/2017 | Holz |
| 2017/0287447 | A1 | 10/2017 | Barry et al. |
| 2017/0293356 | A1 | 10/2017 | Khaderi et al. |
| 2017/0303847 | A1 | 10/2017 | Drucker |
| 2018/0048880 | A1 | 2/2018 | Trail et al. |
| 2018/0073873 | A1 | 3/2018 | Takao et al. |
| 2018/0112862 | A1 | 4/2018 | Gammons et al. |
| 2018/0125423 | A1 | 5/2018 | Chang et al. |
| 2018/0131911 | A1 | 5/2018 | Mizuno |
| 2018/0133507 | A1 | 5/2018 | Malchano et al. |
| 2018/0134217 | A1 | 5/2018 | Peterson et al. |
| 2018/0196511 | A1 | 7/2018 | Chae |
| 2018/0297511 | A1 | 10/2018 | Park et al. |
| 2018/0299953 | A1 | 10/2018 | Selker et al. |
| 2018/0307303 | A1 | 10/2018 | Powderly et al. |
| 2018/0348863 | A1 | 12/2018 | Aimone et al. |
| 2019/0045173 | A1 | 2/2019 | Hicks |
| 2019/0082112 | A1 | 3/2019 | Qian |
| 2019/0174237 | A1 | 6/2019 | Lunner et al. |
| 2019/0179526 | A1* | 6/2019 | Yellen ..................... G11B 27/00 |
| 2019/0365272 | A1 | 12/2019 | Sadeghian-Motahar et al. |
| 2020/0005026 | A1 | 1/2020 | Andersen et al. |
| 2020/0202538 | A1 | 6/2020 | Hsu et al. |
| 2020/0409489 | A1* | 12/2020 | Munemoto ......... G06F 3/03545 |
| 2021/0012574 | A1* | 1/2021 | Fu ............................ G06F 3/017 |
| 2021/0029290 | A1 | 1/2021 | Okuike |
| 2021/0090331 | A1 | 3/2021 | Ravasz et al. |
| 2021/0124417 | A1 | 4/2021 | Ma |
| 2021/0165486 | A1 | 6/2021 | Erivantcev et al. |
| 2021/0235203 | A1 | 7/2021 | Lunner et al. |
| 2022/0028406 | A1 | 1/2022 | Burmistrov et al. |
| 2022/0253808 | A1 | 8/2022 | Ferguson et al. |
| 2022/0319041 | A1 | 10/2022 | Jiang et al. |
| 2023/0065296 | A1 | 3/2023 | Khaleghimeybodi et al. |
| 2024/0029329 | A1 | 1/2024 | Steptoe et al. |
| 2024/0193799 | A1 | 6/2024 | Kantor et al. |
| 2024/0273840 | A1 | 8/2024 | Smith et al. |

FOREIGN PATENT DOCUMENTS

| | | |
|---|---|---|
| WO | 2016180702 A1 | 11/2016 |
| WO | 2017035498 A1 | 3/2017 |

OTHER PUBLICATIONS

Wikipedia., "Normalization," Jan. 2, 2021, Retrieved from the Internet: https://en.wikipedia.org/w/index.php?title=Normalization_(statistics) oldid=997823157, 3 pages.

Wu E., et al., "Back-Hand-Pose 3D Hand Pose Estimation for a Wrist-worn Camera via Dorsum Deformation Network," Proceedings of the 33rd Annual ACM Symposium on User Interface Software and Technology, Oct. 20, 2020, pp. 1147-1160.

Xu W., et al., "Mo2Cap2: Real-Time Mobile 3D Motion Capture with a Cap-Mounted Fisheye Camera," IEEE Transactions on Visualization and Computer Graphics, Feb. 15, 2019, vol. 25, No. 5, 9 Pages.

Yonemoto H., et al., "Egocentric Articulated Pose Tracking for Action Recognition," International Conference on Machine Vision Applications (MVA), 2015, pp. 98-101.

Yuan Y., et al., "3D Ego-Pose Estimation via Imitation Learning," Proceedings of European Conference on Computer Vision (ECCV), 2018, pp. 1-16.

Yuan Y., et al., "Ego-Pose Estimation and Forecasting as Real-Time PD Control," International Conference on Computer Vision (ICCV), 2019, pp. 10082-10092.

Zhou B., et al., "Scene Parsing Through ADE20K Dataset," In Conference on Computer Vision and Pattern Recognition, Jul. 2017, pp. 5122-5130.

Zhou X., et al., "Deep Kinematic Pose Regression," European Conference on Computer Vision, Nov. 24, 2016, pp. 186-201.

Akhter I., et al., "Pose-Conditioned Joint Angle Limits for 3D Human Pose Reconstruction," Proceedings of the IEEE Conference on Computer Vision and Pattern Recognition (CVPR), Jun. 7-12, 2015, pp. 1446-1455.

Baluja S., et al., "Non-Intrusive Gaze Tracking Using Artificial Neural Networks," Jan. 1994, pp. 1-14.

"Blender: Free and Open 3D Creation Software," Retrieved on Oct. 15, 2021, 9 Pages, Retrieved from the Internet: URL: https://www.blender.org.

Bobick A.F., et al., "The Recognition of Human Movement Using Temporal Templates," IEEE Transactions on Pattern Analysis and Machine Intelligence, Mar. 1, 2001, vol. 23, No. 3, pp. 257-267.

Bradski G.R., et al., "Motion Segmentation and Pose Recognition with Motion History Gradients," Machine Vision and Applications, Jul. 31, 2002, vol. 13, No. 3, pp. 174-184.

Campana A. et al., "An Artificial Neural Network That Uses Eye-Tracking Performance to Identify Patients with Schizophrenia," Schizophrenia Bulletin, vol. 25, No. 4, Jan. 1999, pp. 789-799.

Cao Z., et al., "OpenPose: Realtime Multi-Person 2D Pose Estimation Using Part Affinity Fields," arXiv preprint, arXiv:1812.08008V2, May 30, 2019, 14 pages.

Cha Y.W., et al., "Towards Fully Mobile 3D Face, Body, and Environment Capture Using Only Head-Worn Cameras," IEEE Transactions on Visualization and Computer Graphics, 2018, vol. 24, No. 11, 12 Pages.

CMU: "Motion Caption Dataset: CMU Graphics Lab Motion Capture Database," Retrieved on Oct. 15, 2021, 1 Page, Retrieved from the Internet: URL: http://mocap.cs.cmu.edu.

Final Office Action mailed Nov. 1, 2023 for U.S. Appl. No. 17/461,769, filed Aug. 30, 2021, 29 pages.

"HandPosing: A Tool for Quickly Snapping Hands to Objects in VR Using Hand-Tracking," HandPosing: Class List [online], Retrieved

(56) References Cited

OTHER PUBLICATIONS on Feb. 23, 2021, 2 pages, Retrieved from the Internet: URL: https://mephestokhaan.github.io/HandPosing/Documentation/html/annotated.html.

He K., et al., "Mask R-CNN," In Proceedings of the IEEE International Conference on Computer Vision, Oct. 2017, pp. 2961-2969.

Hwang D.H., et al., "MonoEye: Multimodal Human Motion Capture System Using a Single Ultra-Wide Fisheye Camera," Proceedings of the 33rd Annual ACM Symposium on User Interface Software and Technology, Oct. 2020, pp. 98-111.

Hwang D-H., et al., "Toward Human Motion Capturing With an Ultra-Wide Fisheye Camera on the Chest," IEEE Conference on Virtual Reality and 3D User Interfaces (VR), Mar. 23-27, 2019, pp. 1524-1526.

International Preliminary Report on Patentability for International Application No. PCT/US2022/041777, mailed Mar. 14, 2024, 14 pages.

International Search Report and Written Opinion for International Application No. PCT/US2018/062029, mailed Jul. 2, 2019, 11 Pages.

International Search Report and Written Opinion for International Application No. PCT/US2022/022282, mailed Jul. 25, 2022, 13 pages.

International Search Report and Written Opinion for International Application No. PCT/US2022/041777, mailed Feb. 13, 2023, 18 pages.

Invitation to Pay Additional Fees for International Application No. PCT/US2022/041777, mailed Dec. 21, 2022, 12 pages.

Jiang H., et al., "Egocentric Pose Estimation from Human Vision Span," IEEE/CVF International Conference on Computer Vision (ICCV), Oct. 10, 2021, pp. 10986-10994.

Jiang H., et al., "Seeing Invisible Poses: Estimating 3D Body Pose From Egocentric Video," IEEE Conference on Computer Vision and Pattern Recognition (CVPR), 2017, pp. 3501-3509.

Kanazawa A., et al., "End-to-end Recovery of Human Shape and Pose," Computer Vision and Pattern Recognition (CVPR), Jun. 2018, pp. 7122-7131.

Lopez A., et al., "Development of an EOG-Based System to Control a Serious Game," Measurement, vol. 127, Jun. 15, 2018, 8 pages.

Marcard T., et al., "Sparse Inertial Poser: Automatic 3D Human Pose Estimation From Sparse IMUs," Computer Graphics Forum, Wiley Online Library, 2017, vol. 36, No. 2, pp. 349-360.

Martinez J., et al., "A Simple yet Effective Baseline for 3D Human Pose Estimation," Proceedings of the IEEE International Conference on Computer Vision (ICCV), Oct. 2017, pp. 2640-2649.

Mefisto L., "Grabbables—MephestoKhaan / HandPosing Wiki," GitHub [online], Dec. 29, 2020 [Retrieved on Feb. 23, 2021], 3 pages, Retrieved from the Internet: URL: https://github.com/MephestoKhaan/HandPosing/wiki/Grabbables.

Mefisto L., "Hand Puppeting—MephestoKhaan/HandPosing Wiki," GitHub [online], Nov. 23, 2020 [Retrieved on Feb. 23, 2021], 3 pages, Retrieved from the Internet: URL: https://github.com/MephestoKhaan/HandPosing/wiki/Hand-Puppeting.

Mefisto L., "Home—MephestoKhaan / HandPosing Wiki," GitHub [online], Dec. 29, 2020 [Retrieved on Feb. 23, 2021], 3 pages, Retrieved from the Internet: URL: https://github.com/MephestoKhaan/HandPosing/wiki.

Mefisto L., "Snapping Behaviours—MephestoKhaan/HandPosing Wiki," GitHub [online], Dec. 29, 2020 [Retrieved on Feb. 23, 2021], 7 pages, Retrieved from the Internet: URL: https://github.com/MephestoKhaan/HandPosing/wiki/Snapping-Behaviours.

Mefisto L., "Pose Recording—MephestoKhaan/HandPosing Wiki," GitHub [online], Dec. 29, 2020 [Retrieved on Feb. 23, 2021], 10 pages, Retrieved from the Internet: URL: https://github.com/MephestoKhaan/HandPosing/wiki/Pose-Recording.

Mefisto L., "Puppeting Oculus Avatars—MephestoKhaan/HandPosing Wiki," GitHub [online], Dec. 29, 2020 [Retrieved on Feb. 23, 2021], 2 pages, Retrieved from the Internet: URL: https://github.com/MephestoKhaan/HandPosing/wiki/Puppeting-Oculus-Avatars.

"MephestoKhaan/HandPosing: Pose authoring using handtracking on Quest," MIT License, GitHub [online], Retrieved on Feb. 24, 2021, 4 pages, Retrieved from the Internet: URL: https://github.com/MephestoKhaan/HandPosing.

Moreno-Noguer F., "3D Human Pose Estimation from a Single Image via Distance Matrix Regression," Proceedings of the IEEE Conference on Computer Vision and Pattern Recognition (CVPR), 2017, pp. 2823-2832.

Ng E., et al., "You2Me: Inferring Body Pose in Egocentric Video via First and Second Person Interactions," Conference on Computer Vision and Pattern Recognition (CVPR), 2020, pp. 9890-9900.

Non-Final Office Action mailed Jun. 6, 2023 for U.S. Appl. No. 17/461,769, filed Aug. 30, 2021, 27 pages.

Non-Final Office Action mailed Aug. 13, 2021 for U.S. Appl. No. 15/802,333, filed Nov. 2, 2017, 41 pages.

Non-Final Office Action mailed Oct. 2, 2023 for U.S. Appl. No. 17/554,522, filed Dec. 17, 2021, 59 pages.

Pavlakos G., et al., "Coarse-to-Fine Volumetric Prediction for Single-Image 3D Human Pose," IEEE Conference on Computer Vision and Pattern Recognition (CVPR), 2017, pp. 7025-7034.

Rhodin; et al., "EgoCap: Egocentric Marker-Less Motion Capture with Two Fisheye Cameras." ACM Transactions on Graphics (TOG), Dec. 5, 2016, vol. 35, No. 6, 11 pages.

Rhodin; et al., "General Automatic Human Shape and Motion Capture Using Volumetric Contour Cues," Proceedings of the 14th European Conference on Computer Vision 2016, Oct. 11, 2016, 19 pages.

Rogez G., et al., "First-Person Pose Recognition Using Egocentric Workspaces," IEEE Conference on Computer Vision and Pattern Recognition (CVPR), 2015, pp. 4325-4333.

Rokoko: "Smartsuit Pro: Quality Motion Capture in One Simple Suit," Retrieved on Oct. 15, 2021, 7 Pages, Retrieved from the Internet: URL: https://www.rokoko.com/products/smartsuit-pro.

Schneider N. et al., "An Open-Source Low-Cost Eye-Tracking System for Portable Real-Time and Offline Tracking," May 26-27, 2011, 4 pages.

Shiratori T., et al., "Motion Capture from Body-Mounted Cameras," ACM Transactions on Graphics (TOG), Jul. 2011, vol. 30, No. 4, Article 31, pp. 31:1-31:10.

Sumikura S., et al., "OpenVSLAM : A Versatile Visual SLAM Framework," Open Source Software Competition, Oct. 2019, pp. 2292-2295.

Tekin B., et al., "Structured Prediction of 3D Human Pose With Deep Neural Networks," British Machine Vision Conference (BMVC), 2016, 11 pages.

Tome D., et al., "SelfPose: 3D Egocentric Pose Estimation From a Headset Mounted Camera," IEEE Transactions on Pattern Analysis and Machine Intelligence, 2020, 13 pages.

Tome D., et al., "xR-EgoPose: Egocentric 3D Human Pose From an HMD Camera," International Conference on Computer Vision (ICCV), 2019, pp. 7728-7738.

Tu H., et al., "VoxelPose: Towards Multi-Camera 3D Human Pose Estimation in Wild Environment," European Conference on Computer Vision (ECCV), Nov. 3, 2020, 17 Pages.

U.S. Appl. No. 62/239,111, 2016, 32 Pages.

* cited by examiner

TRIGGERING ACTIONS BASED ON DETECTED MOTIONS ON AN ARTIFICIAL REALITY DEVICE

CROSS-REFERENCE TO RELATED APPLICATIONS

This application claims priority to U.S. Provisional Patent Application No. 63/380,410, titled "Triggering Actins Based on Detected Motions on an Artificial Reality Head-Mounted Display," filed Oct. 21, 2022, which is herein incorporated by reference in its entirety.

TECHNICAL FIELD

The present disclosure is directed to triggering actions based on detected motions on an artificial reality (XR) device, such as a head-mounted display (HMD).

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR experiences can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
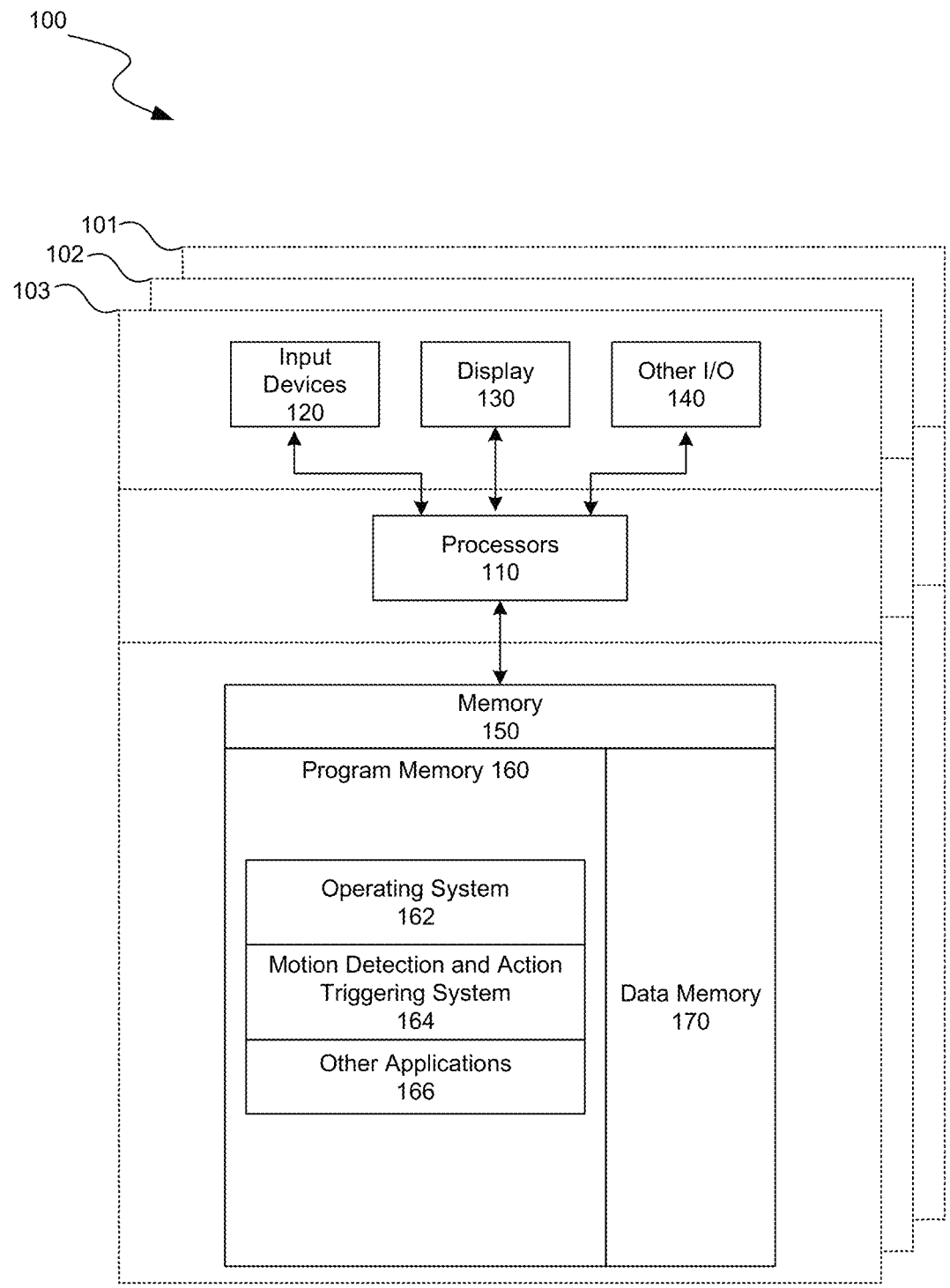
FIG. 1 is a block diagram illustrating an overview of devices on which some implementations of the present technology can operate.

Aspects of the present disclosure are directed to triggering an action based on a motion detected by an artificial reality (XR) device, such as a head-mounted display (HMD). The XR device can display an XR experience to a user. While displaying the XR experience, the XR device can detect a physical interaction with the XR device using one or more sensors (e.g., sensors of an inertial measurement unit (IMU)). The physical interaction can generate a movement profile captured by the one or more sensors. The XR device (or a separate processing component in operable communication with the XR device) can identify the physical interaction as a particular motion by applying a machine learning model to the movement profile. In response to identifying the particular motion, the XR device can trigger an action on the XR device.

For example, a user can don his XR HMD to watch a virtual concert. While watching the virtual concert, the user can double tap his XR HMD. The XR HMD can detect the double tap using an accelerometer integral with the XR HMD and capture a movement profile using the accelerometer. The XR HMD can compare the captured movement profile to known movement profiles associated with known double tap motions to identify the movement profile as being consistent with a double tap. In response to identifying the double tap, the XR HMD can perform an action mapped to a double tap, such as activating pass-through on the XR HMD so that the user can view his real-world environment.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Implementations provide specific technological improvements in the field of artificial reality. For example, implementations allow a user to quickly and easily trigger an action on an XR device, such as a head-mounted display (HMD), without requiring display of a virtual menu on the XR device and selection of an option from the virtual menu. Display, navigation to, and selection of such an option on the XR device would be time consuming, limit the field-of-view of the user, and impede a user's enjoyment of an XR experience. Further, by not requiring display of particular options and menus on the XR device, compute resources can be conserved on the XR device, such as battery and processing power that would otherwise be needed to cause such a display. In addition, although physical buttons on the XR device (and/or other components in operable communication with the XR device) could be used to trigger actions without requiring display of a menu, adding such physical buttons to an XR device would be technically complex and expensive.

Several implementations are discussed below in more detail in reference to the figures. FIG. 1 is a block diagram illustrating an overview of devices on which some implementations of the disclosed technology can operate. The devices can comprise hardware components of a computing system 100 that can trigger actions based on motions detected by an artificial reality (XR) device, such as a head-mounted display (HMD). In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, motion detection and action triggering system 164, and other application programs 166. Memory 150 can also include data memory 170 that can include, e.g., XR experience rendering data, sensor data, movement profile data, known motion data and other machine learning data, action data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
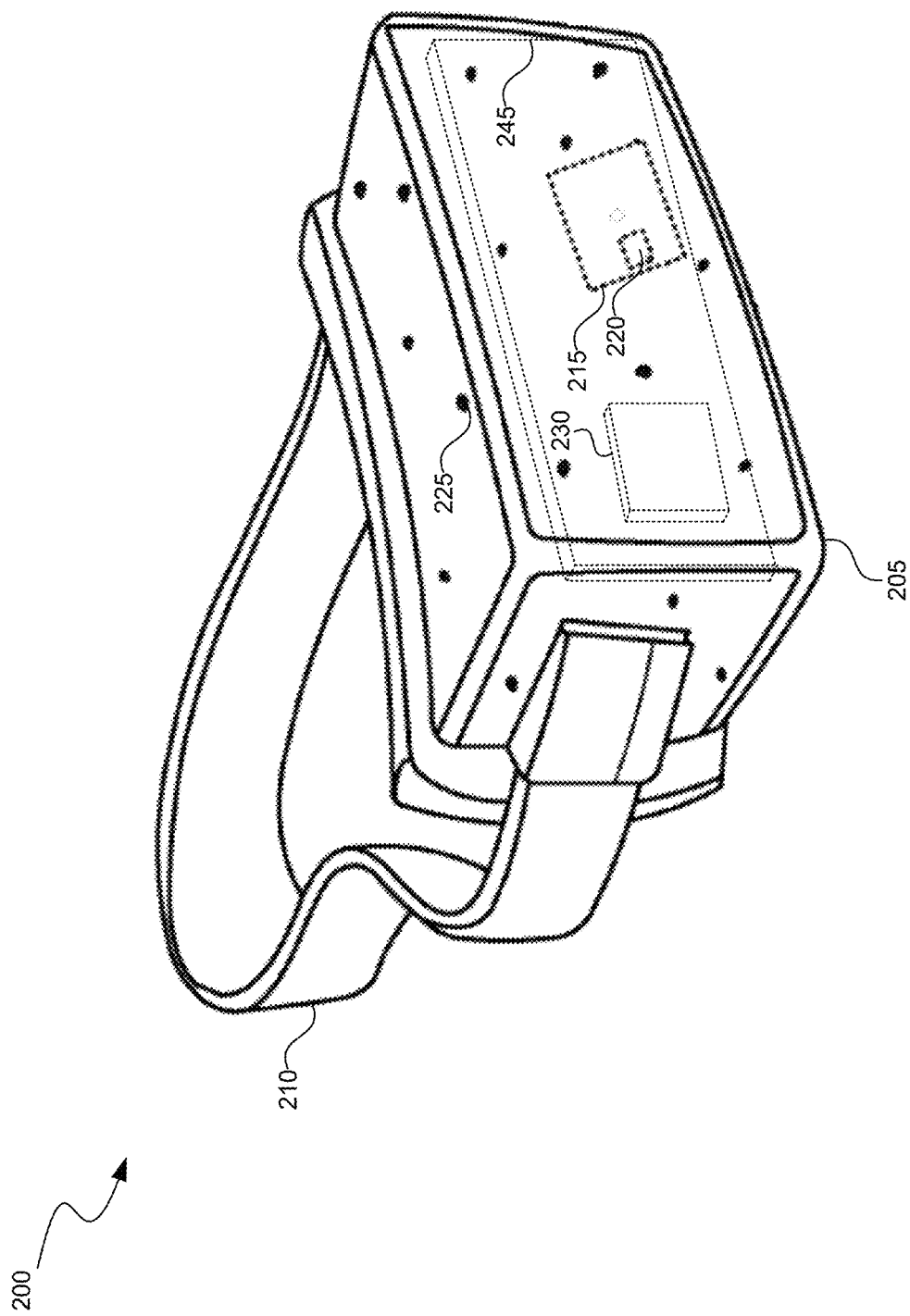
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
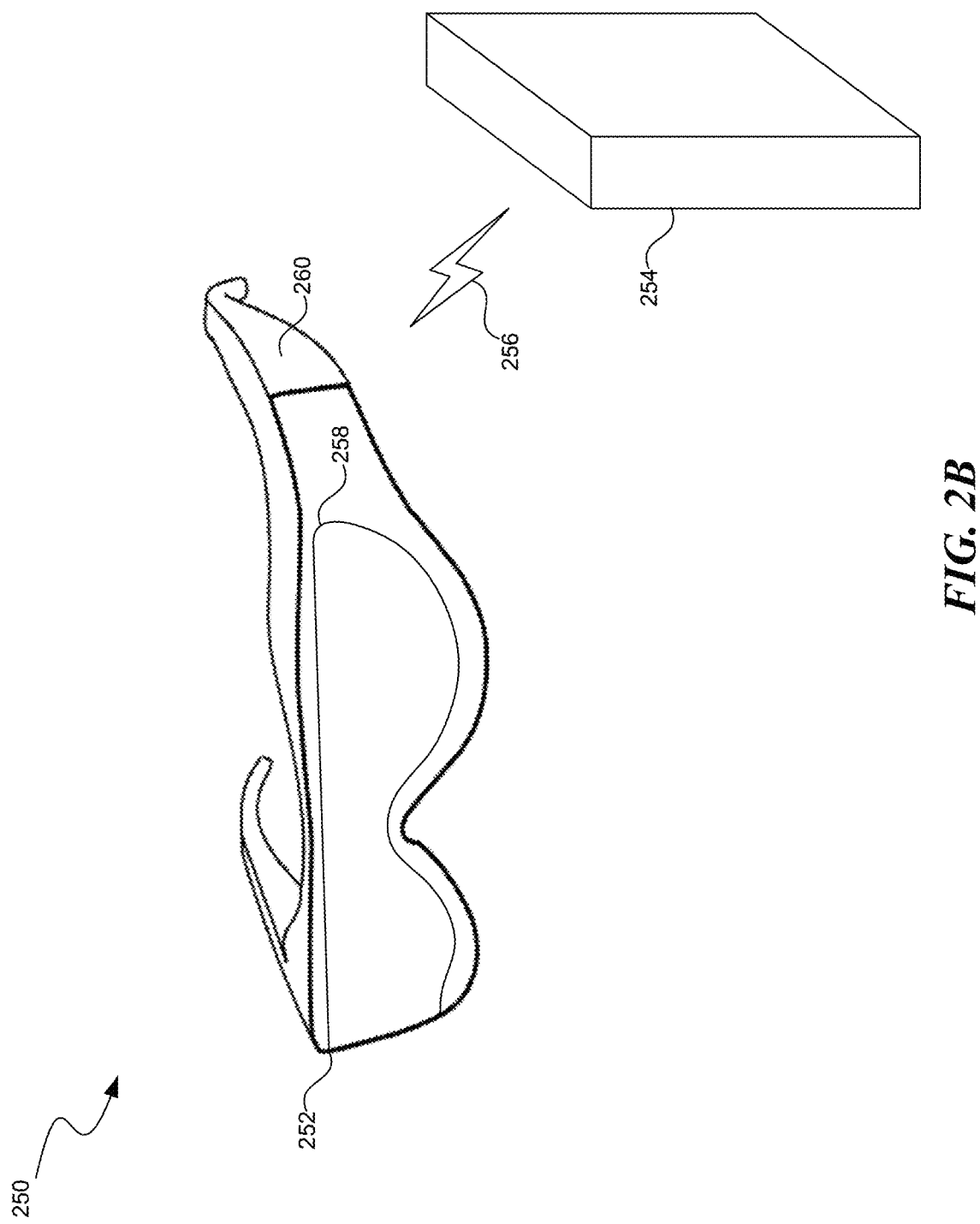
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
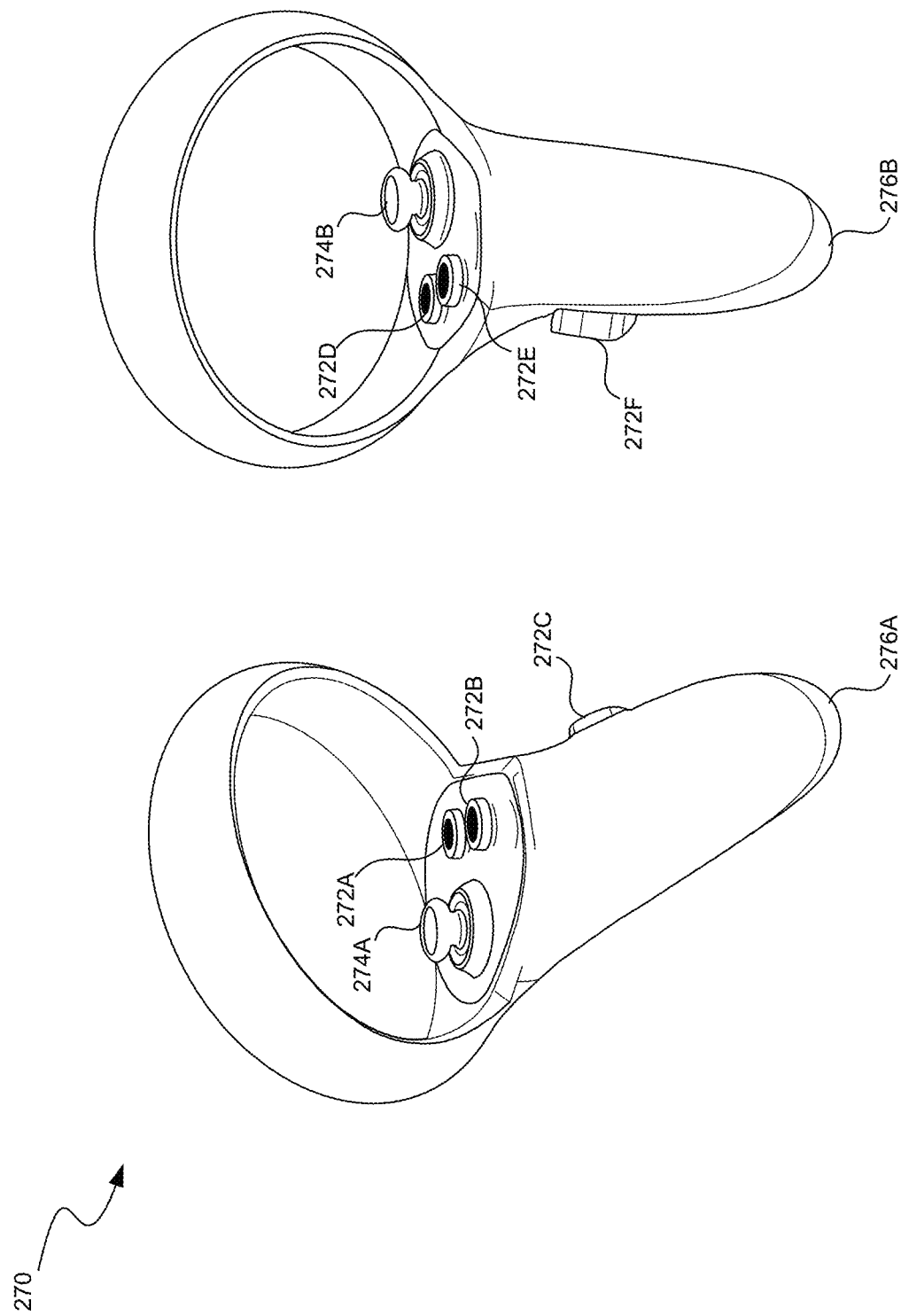
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
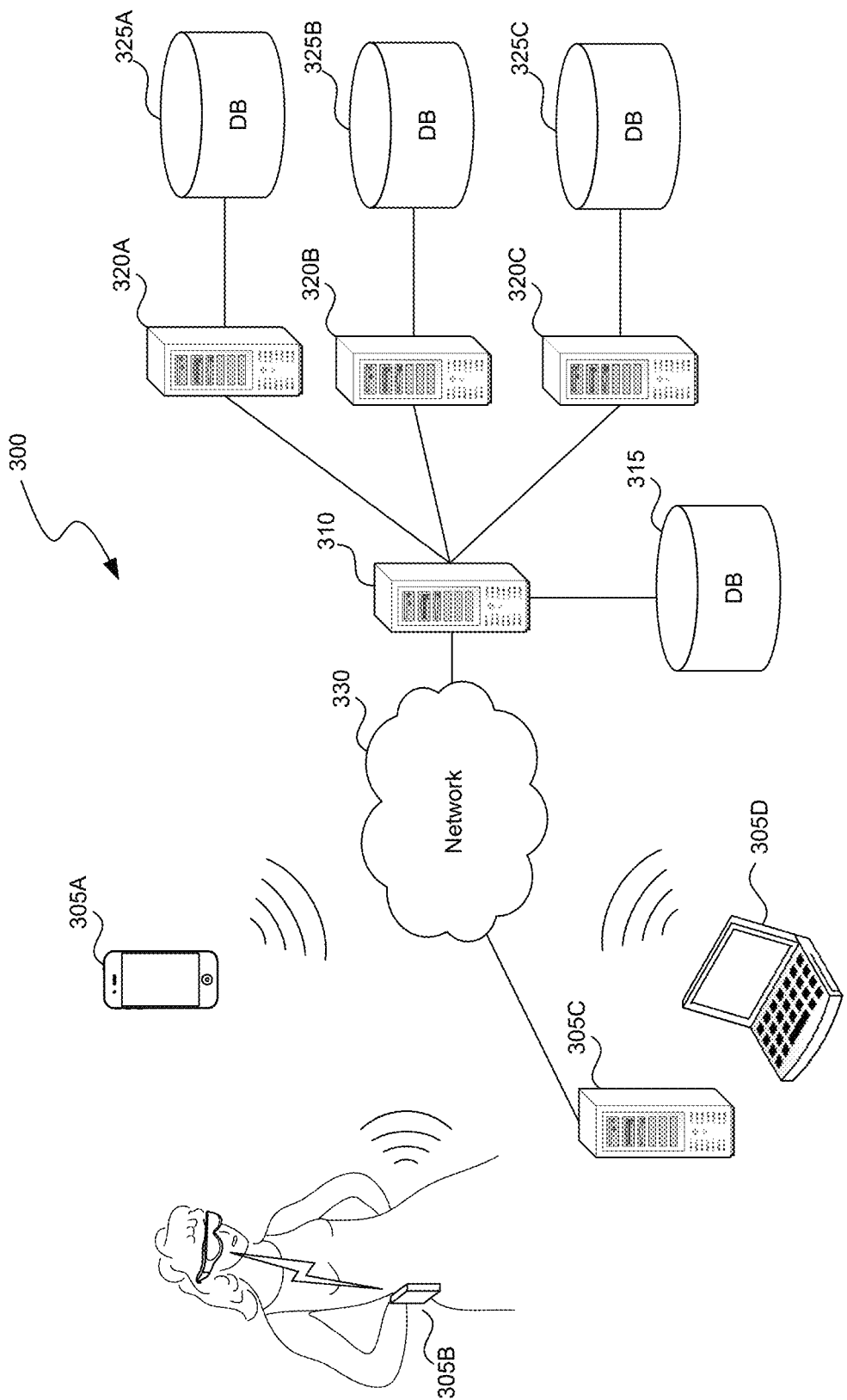
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
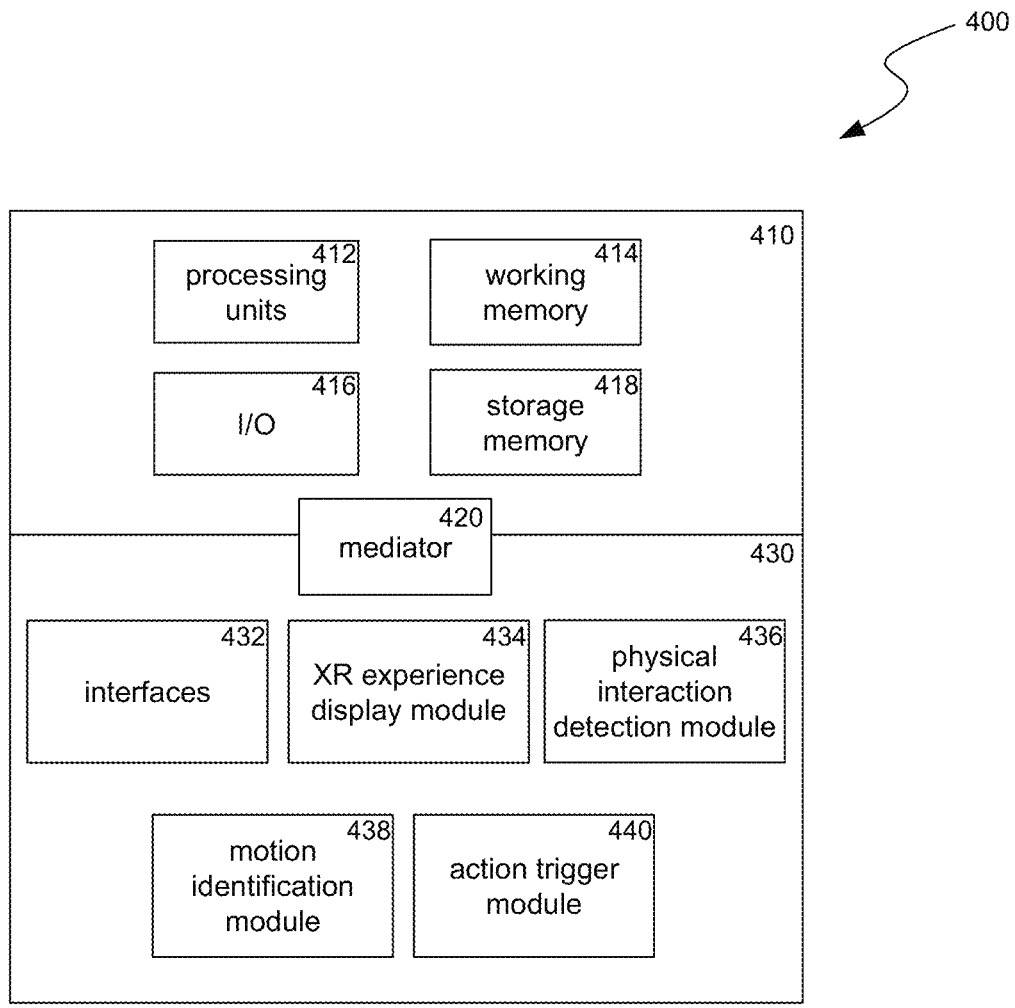
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for triggering actions based on particular motions detected by an artificial reality (XR) device, such as a head-mounted display (HMD). Specialized components 430 can include XR experience display module 434, physical interaction detection module 436, motion identification module 438, action trigger module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XR experience display module 434 can display an XR experience to a user on an XR device, such as a head-mounted display (HMD). The XR experience can be any fully immersive VR, AR, or MR experience in which the user can view computer-generated virtual objects and/or environments that, in some implementations, are mixed with a view of a real-world environment surrounding the user. XR experience display module 434 can display the XR experience by, for example, applying and controlling lighting effects on the XR device. Further details regarding displaying an XR experience to a user on an XR device are described herein with respect to block 502 of FIG. 5.

Physical interaction detection module 436 can detect a physical interaction with the XR device. Physical interaction detection module 436 can detect the physical interaction with the XR device via one or more sensors, e.g., one or more sensors of an inertial measurement unit (IMU) capturing movement of the XR device, one or more cameras capturing movement of the XR device via images, one or more microphones capturing noises made by the physical interactions, one or more capacitance or other touch sensors, etc. In some implementations, input/output devices 416 can include the one or more sensors. In some implementations, the one or more sensors can be integral with the XR device. In some implementations, the one or more sensors can be separate from the XR device, but in operable communication with the XR device, e.g., can be included in a controller proximate to the XR device, such as controller 276A and/or controller 276B of FIG. 2C. The physical interaction can generate a movement profile, such as a waveform, that can be captured by the one or more sensors, e.g., an accelerometer included in an IMU. Further details regarding detecting a physical interaction with an XR device are described herein with respect to block 504 of FIG. 5.

Motion identification module 438 can identify the physical interaction as a particular motion (e.g., a tap on the XR device) by applying a machine learning model to the movement profile. The machine learning model can be trained on existing movement profiles associated with known motions. For example, the machine learning model can be trained on waveforms consistent with particular motions, e.g., accelerometer waveforms associated with known, identified taps on the XR device. In some implementations, the machine learning model can further be trained on negative training instances by, for example, capturing motions of the XR device that do not include taps, and classifying features of those waveforms as non-tap motions. Further details regarding identifying a physical interaction as a particular motion are described herein with respect to block 506 of FIG. 5. Further details regarding applying and training a machine learning model are described herein with respect to FIG. 6.

Action trigger module 440 can, in response to motion identification module 438 identifying the physical interaction as the particular motion, trigger an action on the XR device. In some implementations, action trigger module 440 can access a lookup table in storage memory 418 that maps particular identified motions to specific actions. For example, the lookup table can map a tap on the XR device to activating and/or deactivating pass-through on the XR device. Further details regarding triggering an action on the XR device in response to identifying a particular motion are described herein with respect to block 508 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
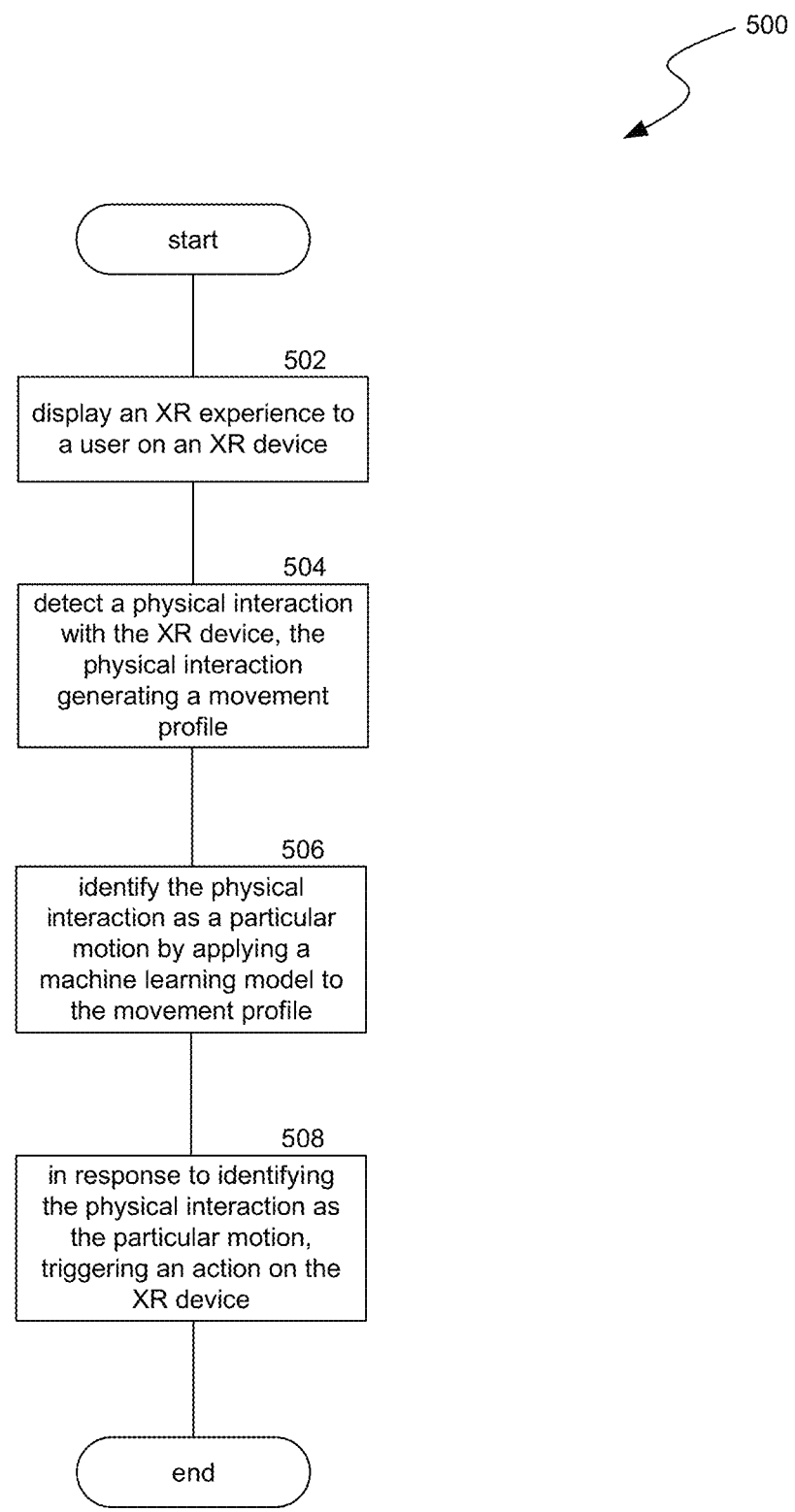
FIG. 5 is a flow diagram illustrating a process used in some implementations of the present technology for triggering an action based on a motion detected by an artificial reality (XR) device.

FIG. 5 is a flow diagram illustrating a process 500 used in some implementations for triggering an action based on a motion detected by an artificial reality (XR) device, such as a head-mounted display (HMD). In some implementations, process 500 can be performed as a response to detection of a physical interaction with the XR device. In some implementations, some or all process 500 can be performed by the XR device, such as HMD 200 of FIG. 2A and/or HMD 252 of FIG. 2B. In some implementations, some of process 500 can be performed by one or more other components of an XR system other than the XR device, such as processing components in operable communication with the XR device and/or a controller in operable communication with the XR device. In some implementations, some of process 500 can be performed by a server located remotely from the XR device. In some implementations, process 500 can be performed by motion detection and action triggering system 164 of FIG. 1. In some implementations, process 500 can be performed by specialized components 430 of FIG. 4.

At block 502, process 500 can display an artificial reality (XR) experience to a user on the XR device. The XR experience can be any fully immersive experience, such as a VR experience, an AR experience, or an MR experience. For example, the XR experience can be an XR application, an XR game, a virtual world, a virtual environment including virtual objects, etc., that is created and/or rendered by the XR device, processing components in operable communication with the XR device, and/or a platform or other computing system hosting the XR experience.

At block 504, process 500 can detect a physical interaction with the XR device. Process 500 can detect the physical interaction with the XR device using one or more sensors integral with the XR device, such as one or more sensors of an inertial measurement unit (IMU), a camera, a microphone, a touch sensor, etc. In some implementations, process 500 can detect the physical interaction with the XR device using one or more sensors separate from the XR device, such as sensors integral with a controller (e.g., controller 276A and/or controller 276B of FIG. 2C) in operable communication with the XR device. The physical interaction can generate a movement profile that can be captured by the one or more sensors. When captured by an IMU integral with the XR device, the movement profile can be captured by one or more of an accelerometer, a gyroscope, a compass, etc. The measurements can include the non-gravitational acceleration of the XR device in the x, y, and z directions; the gravitational acceleration of the XR device in the x, y, and z directions; the yaw, roll, and pitch of the XR device; the derivatives of these measurements; the gravity difference angle of the XR device; and the difference in normed gravitational acceleration of the XR device. In some implementations, the movements of the XR device may be measured in intervals, e.g., over a period of 5 seconds.

At block 506, process 500 can identify the physical interaction as a particular motion by applying a machine learning model to the movement profile. For example, process 500 can classify the movement profile captured by the XR device as a particular motion (e.g., one or more hand taps on the XR device in one or more locations, including a finger tap; a press and hold on the XR device; a swiping motion on the XR device; a particular gesture of the user's head wearing the XR device (e.g., nodding or shaking the head); a particular gesture with the user's hand including a finger or fingers on the XR device; etc.) based on characteristics of the device movements. A "tap" as used herein refer to a movement of the XR device and/or a controller in a hand of a user of the XR device that are indicative of movement of the user's hand (including a finger or fingers) quickly touching the XR device.

In some implementations, in addition to identifying the physical interaction as the particular motion, process 500 can further identify the location on the XR device where the physical interaction occurred. In some implementations, process 500 can identify the location on the XR device where the physical interaction occurred using one or more sensors integral with the XR device, e.g., an inertial measurement unit (IMU). For example, process 500 can determine where the physical interaction occurred based on an amplitude of a sensor measurement (e.g., a physical interaction proximate to the sensor would have a higher amplitude than a physical interaction further from the sensor). Alternatively or additionally, process 500 can determine where the physical interaction occurred by analyzing the amplitudes of sensor measurements from two or more sensors having known locations on the XR device, and triangulating the location of where the physical interaction occurred.

In some implementations, the particular motion can include one or more motions. In some implementations, the particular motions can include a sequence of motions. In such implementations, the machine learning model can be further trained to recognize each motion of the sequence of motions. For example, the particular motion can be a sequence of hand taps, with the machine learning model being trained to recognize each hand tap of the sequence of hand taps. In some implementations, prior to triggering an action on the XR device based on the identification of the particular motion, process 500 can determine that the sequence of motions is complete based on a lapse of a threshold period of time after a motion of the sequence of motions. For example, process 500 can identify two hand taps made within 1 second of each other, then allow 2 seconds to pass. If another hand tap is not made within the 2 seconds, process 500 can determine that the sequence of hand taps is complete, and identify that the particular motion is two hand taps. In some implementations, the particular motion can include a sequence of different motions, such as a hand tap followed by a swiping motion.

In some implementations, the movement profile can be classified as a particular motion based on a comparison of the movement profile to stored movement profiles that are known or confirmed to be associated with particular motions. For example, process 500 can train a machine learning model with accelerometer and/or gyroscope data representative of known particular motions (e.g., hand taps on the XR device). Process 500 can identify relevant features in the data, such as a change in angle of the XR device within a particular range, separately or in conjunction with movement of the XR device within a particular range. When new input data is received, i.e., a new movement profile, process 500 can extract the relevant features from the new accelerometer and/or gyroscope data and compare it to the identified features of the known movement profiles of the trained model. In some implementations, process 500 can use the trained model to assign a match score to the new movement profile, and classify the new movement profile as indicative of a particular motion if the match score is above a threshold, e.g., 75%. In some implementations, process 500 can further receive feedback from the user regarding whether an identified motion is correct to further train the model used to classify movement profiles as indicative of particular motions. Further details regarding applying and training a machine learning model are described herein with respect to FIG. 6.

In response to identifying the physical interaction as the particular motion, process 500 can trigger an action on the XR device at block 508. In some implementations, process 500 can trigger the action on the XR device based on a mapping of detected motions to actions, which can include a mapping of the particular motion to the action. In some implementations, different numbers of motions can be mapped to different actions. For example, one hand tap can be mapped to one action, while two hand taps (or a hand tap followed by a swiping motion) can be mapped to a different action. In some implementations in which the particular motion is a sequence of motions, process 500 can trigger the action on the XR device further in response to determining that the sequence of motions is complete (e.g., that a threshold period of time has passed since the last motion was detected). In some implementations, process 500 can further trigger the action based on the determined location of the physical interaction (e.g., a tap on the front of the XR device can trigger a different action than a tap on the side of the XR device).

In some implementations, the action can include a modification of the XR experience being displayed on the XR device. In some implementations, the action can include activating full or partial pass-through of a real-world environment on the XR device. For example, the action can include displaying (or allowing the user to view, in the case of MR) the real-world environment of the user with or without any virtual objects overlaid thereon. In another example, the action can include activating pass-through for one or more particular portions of the real-world environment, such as for moving objects in the user's real-world environment. In some implementations, the action can include displaying an outline of a real-world environment, as an overlay on an XR environment (e.g., an XR experience), on the XR device. In still another example, the action can include pausing the XR experience on the XR device.

In some implementations, the action can include activating intrusion detection on the XR device. In such implementations, process 500 can further detect a movement in the real-world environment and take a further action based on the detected movement. For example, process 500 can further activate pass-through on the XR device in response to detecting the movement, and/or display a notification of the detected movement on the XR device. In some implementations, process 500 can activate intrusion detection to identify if a particular entity (e.g., a pet, another person, an object, etc.) enters the field-of-view of the XR device using a machine learning model (e.g., an object detection and recognition model), and activate pass-through and/or display a notification of the entity's presence on the XR device.

Figure 6:
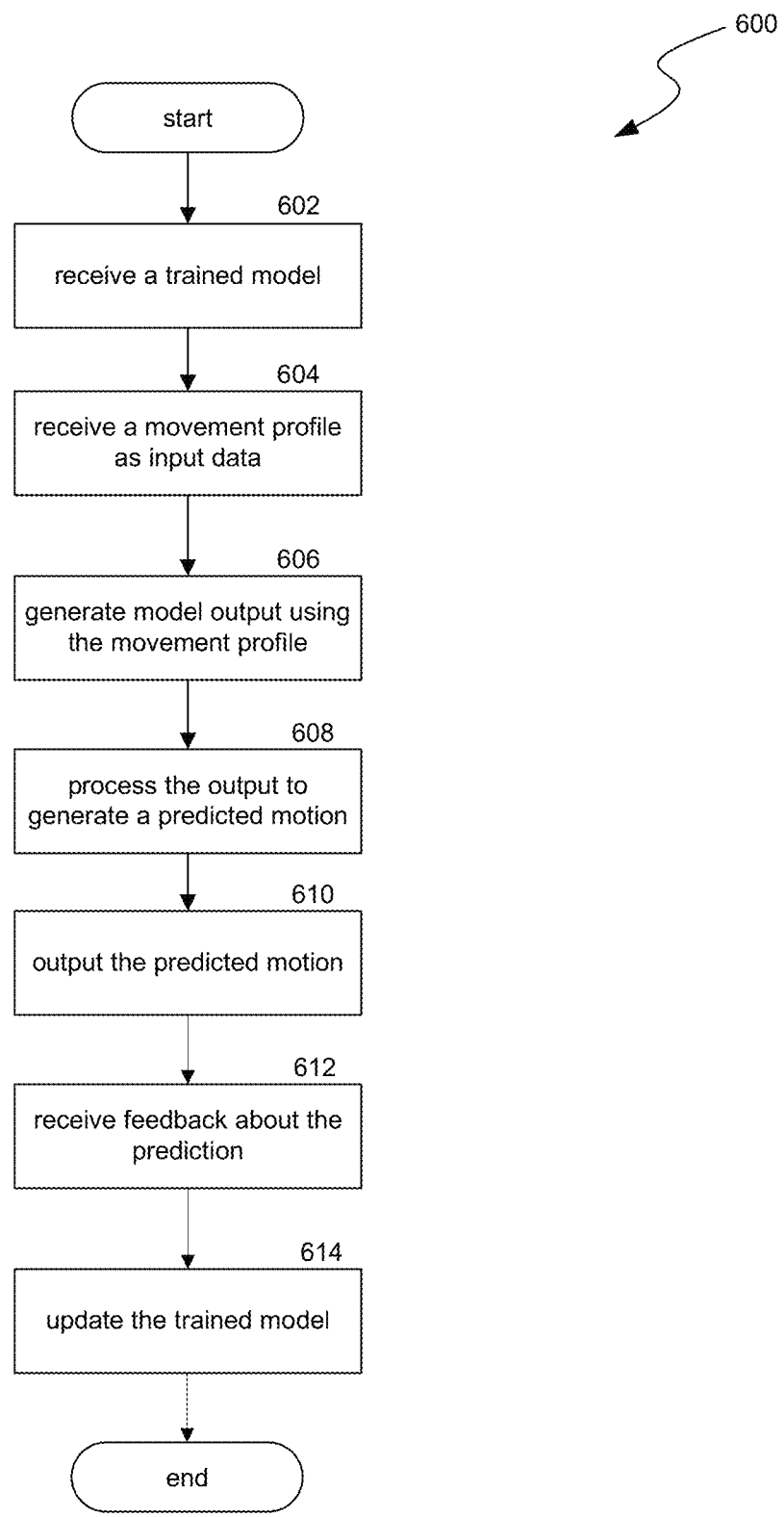
FIG. 6 is a flow diagram illustrating a process used in some implementations for applying and updating a trained model to perform motion identification according to some implementations of the present technology.

FIG. 6 is a flow diagram illustrating a process 600 used in some implementations for applying and updating a trained model to perform motion identification according to some implementations of the present technology. At block 602, process 600 can received a trained model configured to perform motion identification. In some implementations, process 600 can train the model using a collection of movement profiles associated with known motions and applying a feature extraction algorithm to extract features of the movement profiles, such as spikes in acceleration detected by an accelerometer, changes in angle detected by a gyroscope, etc., that can be used to differentiate between different motions. In some implementations, process 600 can train the model by analyzing a large set of training movement profiles associated with known motions and automatically learning the movement profiles' inherent features. Process 600 can map the features of the training movement profiles into a classification space identifying the particular motions associated with those features.

At block 604, process 600 can receive a new movement profile as input data. For example, as described above with respect to block 504 of FIG. 5, process 600 can capture a movement profile for a physical interaction with the XR device. For example, one or more sensors of an IMU can capture accelerometer data, gyroscope data, etc., associated with a user physically interacting with the XR device. In some implementations, process 600 can also receive contextual factors surrounding the movement profile, such as when the movement profile was captured, what was being displayed on the XR device when the movement profile was captured, what was happening in the user's real-world environment (e.g., as captured by a camera and/or microphone integral with or in operable communication with the XR device) when the movement profile was captured, and/or any other contextual data that may be relevant to what type of motion a user might make with respect to the XR device.

At block 606, process 600 can generate a model output using the movement profile, the trained model, and, in some implementations, any contextual factors. In some implementations, based on the input data, process 600 can extract relevant features from the movement profile and map the features as data points to an output vector in the classification space created using the training data.

At block 608, process 600 can process the model output to generate a predicted motion based on the movement profile. In some implementations, process 600 can generate a match score between the output (i.e., the mapped features of the movement profile) and the features of candidate movement profiles in the classification space by calculating a distance between the output and the candidate movement profiles. The match score can be any numerical or textual value or indicator, such as a statistic or percentage. Process 600 can identify the predicted motion based on, for example, the candidate movement profile associated with a candidate motion having the highest match score to the output.

At block 610, process 600 can output the predicted motion. In some implementations, process 600 can output the predicted motion to the XR device capturing the new movement profile, e.g., as a textual and/or audible indication of what the predicted motion was. In some implementations, process 600 can output the predicted motion to action trigger module 440 of FIG. 4 to cause action trigger module 440 to trigger an action in accordance with the predicted motion.

At block 612, process 600 can receive feedback about the predicted motion. In some implementations, the feedback can be explicit, e.g., the user audibly confirms that the predicted motion and/or triggered action is correct, the user audibly announces that the predicted motion and/or triggered action is incorrect, the user identifies the correct motion, the user selects a virtual button indicating that the predicted motion is correct or incorrect, etc. In some implementations, the feedback can be implicit, e.g., the user does not correct the predicted motion, the user allows the triggered action to continue, the user corrects the triggered action (e.g., audibly or through further physical interaction and/or selection), etc. In some implementations, the user can provide feedback via the XR device.

At block 614, process 600 can update the trained model. For example, process 600 can use the feedback data to identify whether the predicted motion was correct or incorrect (and, if incorrect, what the correct motion was, if known), and use that information as a comparison factor to update the model and/or the classification space. In some implementations, process 600 can weigh the current training data more heavily than the initial or past training data, as the later training data can be considered more relevant and/or accurate. Although illustrated as a single process 600 in FIG. 6, it is contemplated that process 600 can be performed multiple times and/or repeatedly, either consecutively or concurrently, as additional movement profiles are received, and/or to refine the trained model.

Some implementations of the motion detection and action triggering system can include a machine learning component, such as a neural network, that is trained using a variety of data, including movement profiles of known motions, contextual factors, and/or whether the user identified a predicted motion as correct or incorrect. Some implementations can feed input data including a new movement profile and contextual factors into the trained machine learning component, and based on the output, can generate a predicted motion. Some implementations provide this predicted motion to a user via a display on the XR device and/or trigger an action based on the predicted motion. Some implementations can receive feedback about the predicted motion to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including a movement profile and, in some implementations, any contextual factors. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to predict a motion from the movement profile. In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

A machine learning model can be trained with supervised learning, where the training data includes movement profiles of known motions and, in some implementations, any contextual factors, as input, and a desired output, such as a prediction of a motion. A current movement profile can be provided to the model. Output from the model can be compared to the desired output for that movement profile, and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Some implementations of the motion detection and action triggering system can include a deep learning component. A "deep learning model," as used herein, refers to a construct trained to learn by example to perform classification directly from movement profiles. The deep learning model is trained by using a large set of labeled data and applying a neural network as described above that includes many layers. With respect to motion identification from movement profiles, the deep learning model in some implementations can be a convolutional neural network (CNN) that is used to automatically learn a movement profile's inherent features to identify a particular motion. For example, the deep learning model can be an R-CNN, Fast R-CNN, or Faster-RCNN.

Figure 7A:
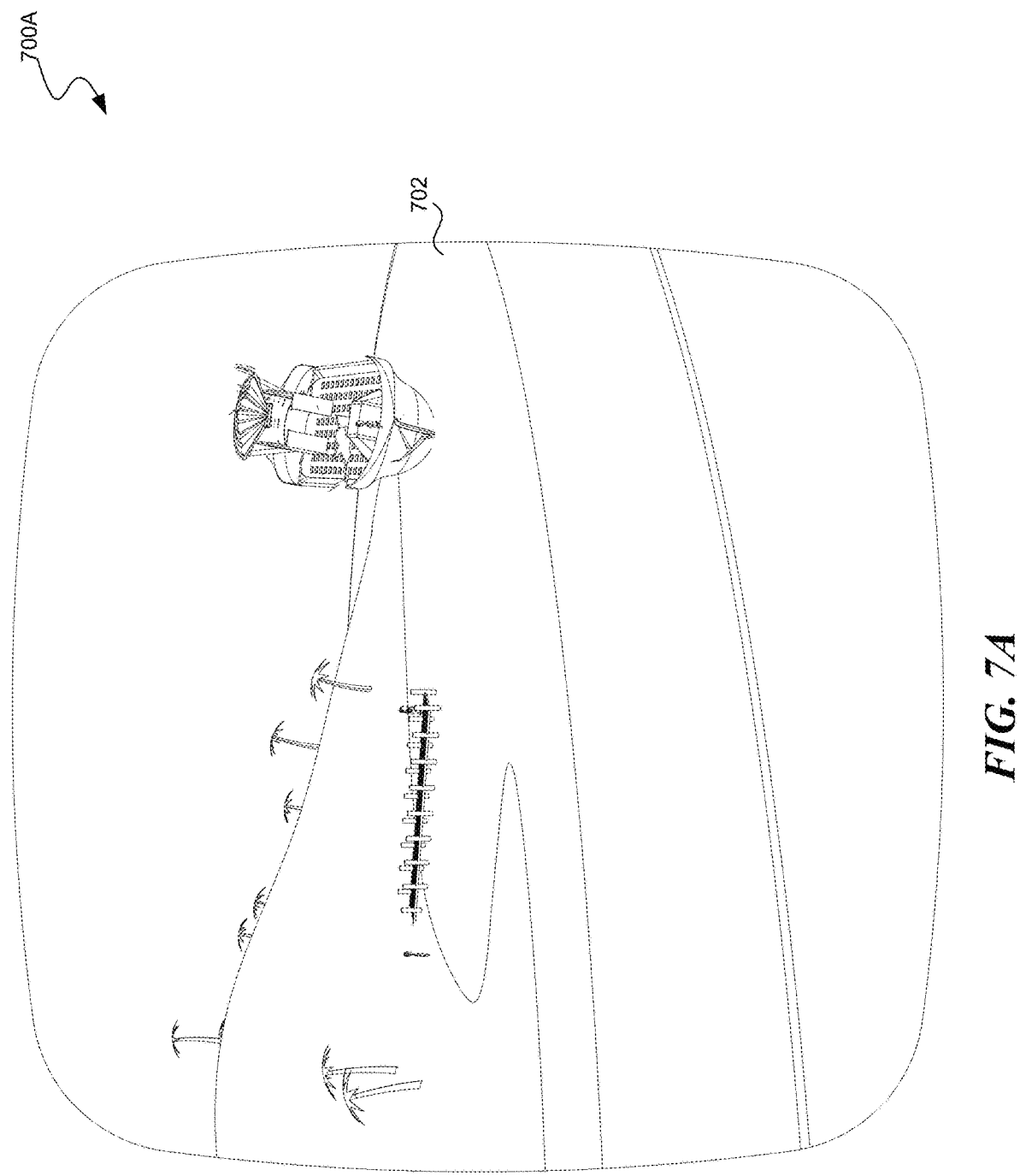
FIG. 7A is a conceptual diagram illustrating an example view of an artificial reality (XR) experience on an XR device.

FIG. 7A is a conceptual diagram illustrating an example view 700A of an artificial reality (XR) experience 702 on an XR device, such as a head-mounted display (HMD). View 700A can be a view of a user wearing the XR device to view XR experience 702. In view 700A, XR experience 702 is a fully immersive computer-generated virtual reality (VR) experience that can be displayed prior to detecting a physical interaction with the XR device consistent with a particular motion that triggers an action.

Figure 7B:
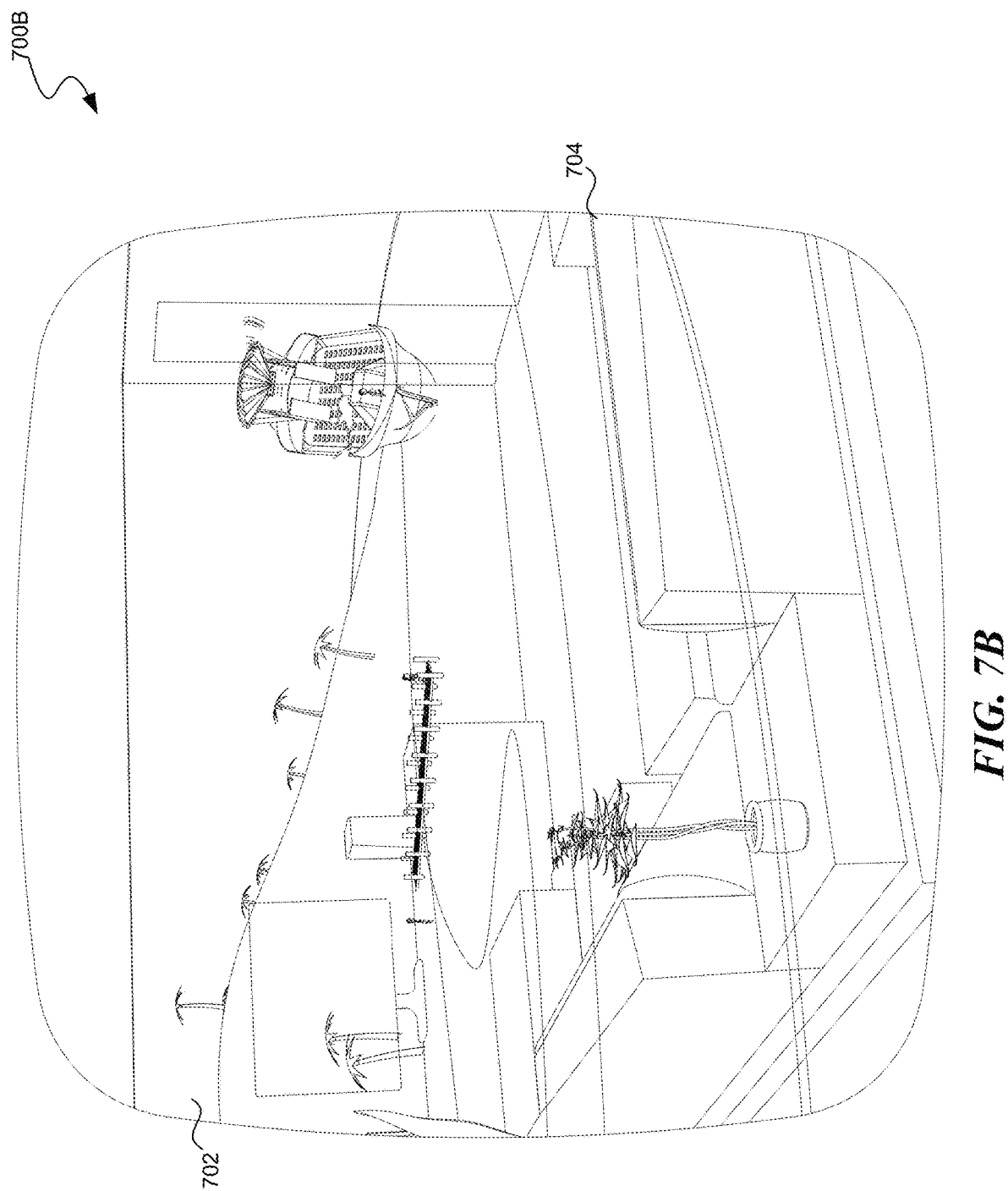
FIG. 7B is a conceptual diagram illustrating an example view of an artificial reality (XR) experience with an outline of a real-world environment being displayed on an XR device in response to a particular motion being detected.

FIG. 7B is a conceptual diagram illustrating an example view 700B of an artificial reality (XR) experience 702 with an outline 704 of a real-world environment being displayed on an XR device, such as a head-mounted display (HMD). View 700B can be a view of a user wearing the XR device, and in some implementations, can be the same user that had view 700A. Some implementations can generate and display view 700B instead of view 700A in response to detecting and identifying a particular motion on the XR device (e.g., a dragging motion of the user's finger or hand on the XR device, a swiping motion of the user's finger or hand on the XR device, a tap of the user's finger or hand on the XR device, pressing of the user's finger or hand on the XR device, etc.), without requiring selection of a button or other physical or virtual selectable element. The particular motion can be mapped to a specific action, e.g., to display outline 704 of the real-world environment overlaid onto XR experience 702. For example, the system can perform edge detection on images from the real-world environment around the user and, in response to the trigger action of a user double tapping the device, the system can overlay the real-world object edges over the VR experience.

Figure 7C:
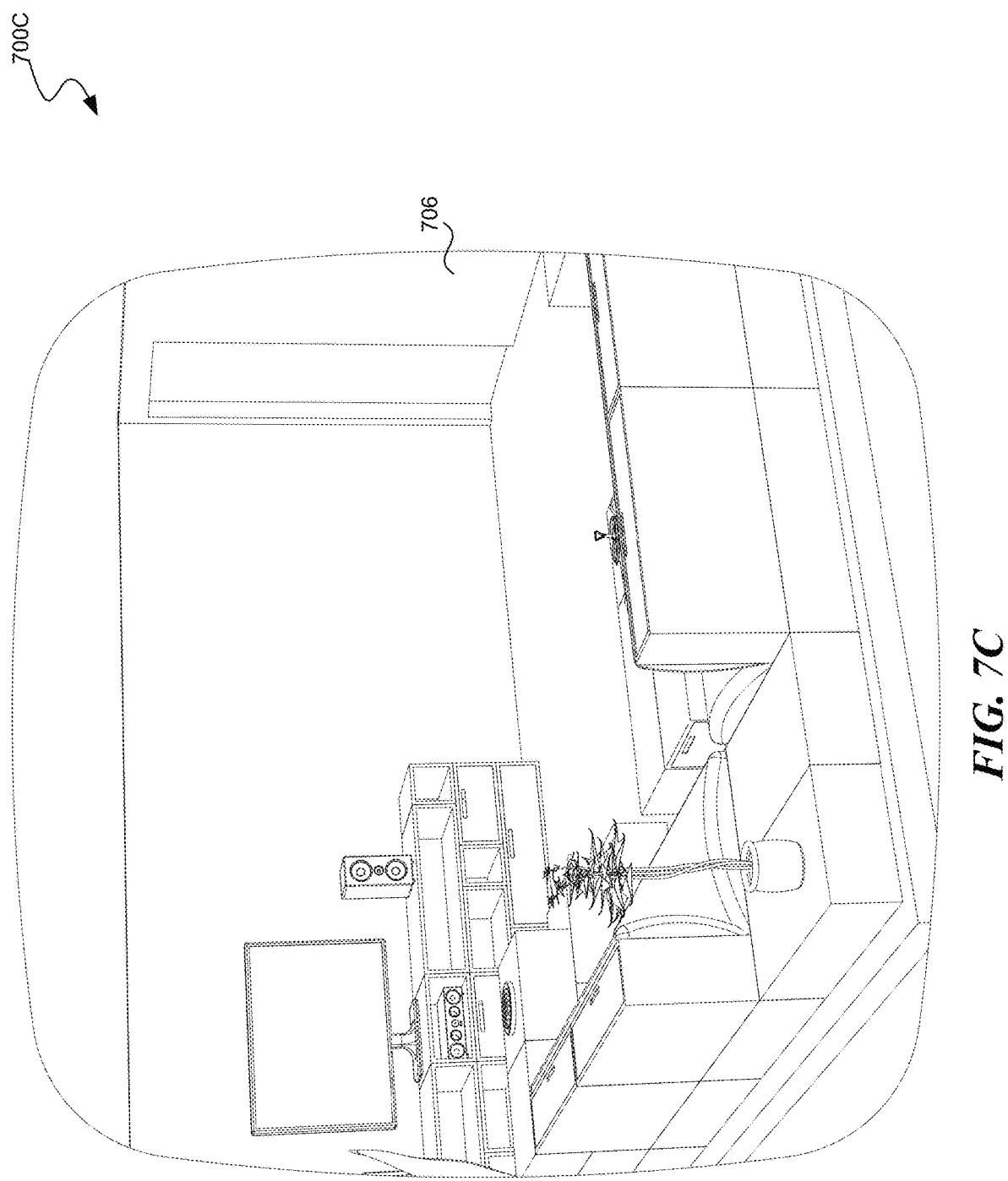
FIG. 7C is a conceptual diagram illustrating an example view of a pass-through feed being displayed on an artificial reality (XR) device in response to a particular motion being detected.

FIG. 7C is a conceptual diagram illustrating an example view 700C of a pass-through feed 706 being displayed on an artificial reality (XR) device, such as a head-mounted display (HMD). View 700C can be a view of a user wearing the XR device, and, in some implementations, can be the same user that had view 700A and/or 700B. Some implementations can generate and display view 700C (instead of view 700A and/or view 700B) in response to detecting and identifying a particular motion on the XR device (e.g., a dragging motion of the user's finger or hand on the XR device, a swiping motion of the user's finger or hand on the XR device, a tap of the user's finger or hand on the XR device, pressing of the user's finger or hand on the XR device, etc.), without requiring selection of a button or other physical or virtual selectable element. The particular motion can be mapped to a specific action, i.e., to display pass-through feed 706 of the real-world environment. For example, the XR device can include multiple cameras (e.g., black and white and/or color) from which the XR device can knit together images to generate a 180 or 360 degree view of the user's real-world environment. If some of the images are black and white, data from a color camera can be used to fill in the color information in the 360 or 180 degree view. In some cases, this can include applying a machine learning model trained to take a 180 or 360 degree black and white image and a color image and produce a 360 or 180 degree color image. Upon detecting the user's trigger action, such as double tapping the XR device, the 360 or 180 degree color image can be provided to the user instead of the VR experience. In some implementations, the pass-through feed 706 can alternatively be a true view of the real-world environment, such as on a mixed reality (MR) device.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for triggering an action based on a particular motion detected by an artificial reality device, the method comprising:

displaying an artificial reality experience to a user on the artificial reality device;

detecting, by one or more sensors, including at least an inertial measurement unit (IMU), integral with the artificial reality device, a physical interaction with the artificial reality device comprising one or more hand taps on the artificial reality device, the physical interaction generating a movement profile of the one or more hand taps on the artificial reality device;

identifying the physical interaction as the particular motion by applying a machine learning model to the movement profile, the machine learning model being trained on existing movement profiles associated with known motions of hand taps on artificial reality devices; and in response to identifying the physical interaction as the particular motion, triggering the action on the artificial reality device based on a mapping of detected motions to actions which includes a mapping of one or more hand taps to the action.

2. The method of claim 1,
wherein the one or more hand taps includes a sequence of hand taps,
wherein the machine learning model is further trained to recognize each hand tap of the sequence of hand taps, and
wherein the method further comprises:
  prior to triggering the action on the artificial reality device, determining that the sequence of hand taps is complete based on a lapse of a threshold period of time after a hand tap of the sequence of hand taps,
  wherein the action is triggered on the artificial reality device further in response to determining that the sequence of hand taps is complete.

3. The method of claim 1, wherein the mapping of detected motions to actions includes mappings of different numbers of hand taps to different actions.

4. The method of claim 1, wherein the action includes activating pass-through of a real-world environment on the artificial reality device.

5. The method of claim 1, wherein the action includes displaying an outline of a real-world environment, as an overlay on an artificial reality environment, on the artificial reality device.

6. The method of claim 1,
wherein the action includes activating intrusion detection on the artificial reality device, and
wherein the method further comprises:
  in response to activating intrusion detection on the artificial reality device, detecting a movement in a real-world environment by the artificial reality device; and
  displaying a notification of the detected movement on the artificial reality device.

7. The method of claim 1, wherein the action includes pausing the artificial reality experience on the artificial reality device.

8. A non-transitory computer-readable storage medium storing instructions that, when executed by a computing system, cause the computing system to perform a process for triggering an action based on a particular motion detected by an artificial reality device, the process comprising:
  displaying an artificial reality experience to a user on the artificial reality device;
  detecting, by one or more sensors integral with the artificial reality device, a physical interaction with the artificial reality device, the physical interaction generating a movement profile;
  identifying the physical interaction as the particular motion by applying a machine learning model to the movement profile, the machine learning model being trained on existing movement profiles associated with known motions; and
  in response to identifying the physical interaction as the particular motion, triggering the action on the artificial reality device.

9. The non-transitory computer-readable storage medium of claim 8,
wherein the particular motion is one or more hand taps on the artificial reality device, and
wherein the action is triggered on the artificial reality device based on a mapping of detected motions to actions which includes a mapping of one or more hand taps to the action.

10. The non-transitory computer-readable storage medium of claim 8, wherein the particular motion is a swiping motion on the artificial reality device.

11. The non-transitory computer-readable storage medium of claim 8,
wherein the particular motion includes a sequence of motions,
wherein the machine learning model is further trained to recognize each motion of the sequence of motions, and
wherein the process further comprises:
  prior to triggering the action on the artificial reality device, determining that the sequence of motions is complete based on a lapse of a threshold period of time after a motion of the sequence of motions,
  wherein the action is triggered on the artificial reality device further in response to determining that the sequence of motions is complete.

12. The non-transitory computer-readable storage medium of claim 8,
wherein the action is triggered on the artificial reality device based on a mapping of detected motions to actions which includes a mapping of the particular motion to the action,
wherein the particular motion includes one or more motions, and
wherein the mapping of detected motions to actions includes mappings of different numbers of motions in the one or more motions to different actions.

13. The non-transitory computer-readable storage medium of claim 8, wherein the action includes activating pass-through of a real-world environment on the artificial reality device.

14. The non-transitory computer-readable storage medium of claim 8, wherein the action includes displaying an outline of a real-world environment, as an overlay on an artificial reality environment, on the artificial reality device.

15. The non-transitory computer-readable storage medium of claim 8,
wherein the action includes activating intrusion detection on the artificial reality device, and
wherein the process further comprises:
  in response to activating intrusion detection on the artificial reality device, detecting a movement in a real-world environment by the artificial reality device; and
  displaying a notification of the detected movement on the artificial reality device.

16. The non-transitory computer-readable storage medium of claim 8, wherein the action includes pausing the artificial reality experience on the artificial reality device.

17. A computing system for triggering an action based on a particular motion detected by an artificial reality device, the computing system comprising:

one or more processors; and one or more memories storing instructions that, when executed by the one or more processors, cause the computing system to perform a process comprising:

displaying an artificial reality experience to a user on the artificial reality device;

detecting, by one or more sensors integral with the artificial reality device, a physical interaction with the artificial reality device, the physical interaction generating a movement profile;

identifying the physical interaction as the particular motion by applying a machine learning model to the movement profile, the machine learning model being trained on existing movement profiles associated with known motions; and in response to identifying the physical interaction as the particular motion, triggering the action on the artificial reality device.

18. The computing system of claim 17, wherein the particular motion is one or more hand taps on the artificial reality device, and wherein the action is triggered on the artificial reality device based on a mapping of detected motions to actions which includes a mapping of one or more hand taps to the action.

19. The computing system of claim 17, wherein the particular motion is a swiping motion on the artificial reality device.

20. The computing system of claim 17, wherein the particular motion includes a sequence of motions, wherein the machine learning model is further trained to recognize each motion of the sequence of motions, and wherein the process further comprises:

prior to triggering the action on the artificial reality device, determining that the sequence of motions is complete based on a lapse of a threshold period of time after a motion of the sequence of motions, wherein the action is triggered on the artificial reality device further in response to determining that the sequence of motions is complete.

\* \* \* \* \*